(12) United States Patent
Igami (10) Patent No.: US 8,042,793 B2
(45) Date of Patent: Oct. 25, 2011

(54) SOLID ENGINE MOUNT

(75) Inventor: Hajime Igami, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1091 days.

(21) Appl. No.: 11/470,571

(22) Filed: Sep. 6, 2006

(65) Prior Publication Data
US 2008/0054538 A1 Mar. 6, 2008

(51) Int. Cl.
*B60G 11/22* (2006.01)

(52) U.S. Cl. ............ 267/292; 267/153; 267/140.11; 267/270; 180/297; 180/300

(58) Field of Classification Search .......... 267/292, 267/293, 153, 141.1–141.7, 140.11, 141, 267/140.5, 270; 248/550, 555, 634, 659, 248/675; 180/291, 292, 297, 299, 300, 312; 280/124.106, 124.128, 124.166
See application file for complete search history.

(56) References Cited

U.S. PATENT DOCUMENTS

| | | | |
|---|---|---|---|
| 1,541,276 A * | 6/1925 | Powell | 267/270 |
| 3,140,081 A * | 7/1964 | Peterson | 267/153 |
| 3,556,445 A * | 1/1971 | Werner | 248/612 |
| 3,825,090 A * | 7/1974 | Runkle et al. | 180/292 |
| 3,836,100 A | 9/1974 | Von Hardenberg et al. | |
| 3,903,738 A | 9/1975 | Malchow | |
| 4,245,853 A * | 1/1981 | Inoue et al. | 280/124.143 |
| 4,610,421 A * | 9/1986 | Ohta et al. | 248/550 |
| 4,941,544 A * | 7/1990 | Fischle et al. | 180/292 |
| 5,035,397 A | 7/1991 | Yamada | |
| 5,129,479 A * | 7/1992 | Fujii et al. | 180/297 |
| 5,152,510 A | 10/1992 | Komabashiri | |
| 5,718,407 A | 2/1998 | Lee | |
| 5,740,876 A * | 4/1998 | Shimose et al. | 180/232 |
| 6,022,034 A * | 2/2000 | Santo et al. | 280/124.106 |
| 6,094,818 A * | 8/2000 | Ogawa et al. | 29/896.93 |
| 6,120,011 A | 9/2000 | Maeno | |
| 6,460,822 B1 | 10/2002 | Lee | |
| 6,547,207 B1 | 4/2003 | Thompson | |
| 6,568,363 B2 | 5/2003 | Koyama et al. | |
| 6,612,279 B2 | 9/2003 | Asahara | |
| 6,708,793 B2 * | 3/2004 | Witherspoon et al. | 180/291 |
| 2003/0107163 A1 | 6/2003 | Asano et al. | |
| 2005/0217918 A1 | 10/2005 | Endo | |
| 2006/0144631 A1 | 7/2006 | Kim | |

FOREIGN PATENT DOCUMENTS

| | | |
|---|---|---|
| DE | 4009995 | 9/1991 |
| EP | 0332861 | 9/1989 |
| JP | 2001-097050 | 4/2001 |
| JP | 2001-105897 | 4/2001 |

* cited by examiner

*Primary Examiner* — Robert Siconolfi
*Assistant Examiner* — Mariano Sy
(74) *Attorney, Agent, or Firm* — Plumsea Law Group, LLC; Mark E. Duell (57) ABSTRACT

A mounting scheme for attaching a power train to a motor vehicle frame includes a plurality of mounts. At least one of the mounts is a solid engine mount having a metal housing and an elastomeric bushing. The elastomeric bushing contains no voids other than a central bore used to attach the mount to a bracket. The elastomeric bushing includes frustoconical portions, where one end of each of the frustoconical portions is unconstrained by the metal housing. The stiffness of the mount may be tuned to reduce noise and improve handling. The stiffnesses of any of the axes may be adjusted so that the power train roll center aligns with the power train center of gravity.

17 Claims, 5 Drawing Sheets

SOLID ENGINE MOUNT

BACKGROUND OF THE INVENTION

1. Field of the Invention

The present invention relates generally to motor vehicles, and in particular the present invention relates to a solid engine mount suitable for use with motor vehicles.

2. Description of Related Art

The power train of a motor vehicle generates motions that can be discerned by the passengers of the motor vehicle as Noise, Vibration, and Harshness (NVH). The support provided by the power train mounting system is used to improve NVH by absorbing or resisting the motion of the power train. The mounting system attaching the power train to the motor vehicle frame generally provides a response to the vertical, horizontal, and torque motion of the power train to absorb the motions of the power train and to minimize the transfer of those vibrations and their effects such as NVH to the passenger compartment of the motor vehicle.

The related art teaches a variety of features and functions related to mounting systems for attaching a power train to a motor vehicle.

U.S. Pat. No. 6,547,207 to Thompson teaches a motorcycle engine mount with an elastomeric member with a central cavity. The elastomeric member is sandwiched between metal plates. The elastomeric member is generally cylindrical, not frustoconical, in shape. Further, the ends of the elastomeric member are not free, as one of the metal plates rests flush against one end of the elastomeric member, while the other end of the elastomeric member is fitted to an interior surface of the other metal plate. Additionally, the sides of the Thompson elastomeric member are not covered by a metal housing.

U.S. patent application publication No. 2003/0107163 to Asano et al. teaches a vibration isolation bushing with an elastomeric body positioned between an inner cylinder and an outer cylinder. The inner cylinder defines the central bore. However, Asano et al. does not teach the use of a solid elastomeric body, as several axial bores are formed in the elastomeric body in addition to the central bore. These axial bores give the Asano et al. elastic body a frustoconical shape in cross-section. The frustoconical shapes in the Asano et al. mount are orthogonal to the central bore through the mount. Further, the small ends of the frustoconical shapes in the Asano et al. mount are constrained by the metal housing of the mount.

U.S. Pat. No. 3,836,100 to Von Hardenberg et al. teaches placing a front mount of a helicopter engine and a rear upper mount on the horizontal line of restraint passing through the center of gravity. The rear upper mount has significant lateral stiffness, but near zero vertical stiffness. A rear lower mount has significant vertical stiffness, but near zero lateral stiffness. This arrangement decouples the engine roll response from frame lateral input motion.

DE patent number 4009995 to Edison et al. teaches using two static mounts to define a roll axis having low stiffness in the roll direction. A lateral mount provides significant stiffness orthogonal to the roll axis, but also includes a decoupled dampener to provide soft, dynamic response to isolate engine vibrations about the roll axis during idling.

While the related art teaches a number of different mounts and torque roll axis features due to placement of the mounts, what is needed is a solid engine mount with the axial stiffnesses optimized for NVH characteristics. Also needed is a power train mounting scheme that positions the power train roll center at or near the power train center of gravity to optimize NVH characteristics.

SUMMARY OF THE INVENTION

In one aspect, the invention provides a mount for a motor vehicle power train comprising: a housing attachable to the motor vehicle, an elastomeric bushing disposed within the housing, the elastomeric bushing being of solid construction with a single central bore and having at least one frustoconical portion with an exposed end.

In another aspect, the elastomeric bushing has two frustoconical portions positioned adjacent to and tapering away from each other.

In another aspect, each of the two frustoconical portions includes an exposed end.

In another aspect, the mount has a first axis coaxial with the central bore, a second axis is orthogonal to and coplanar with the first axis, and a third axis is orthogonal to both the first axis and the second axis, the mount also has a first stiffness measured along the first axis, a second stiffness measured along the second axis, and a third stiffness measured along the third axis, wherein the second stiffness is substantially the same as the third stiffness, wherein the first stiffness is between about 20 percent and about 30 percent of the second stiffness.

In another aspect, the first stiffness is about 26 percent of the second stiffness.

In another aspect, the elastomeric bushing comprises a rubber material.

In another aspect, the mount is attached to a motor vehicle frame with a bracket, wherein the bracket is attached to the mount at the central bore with a connecting member.

In another aspect, the connecting member comprises a bolt, a screw, or a pin.

In another aspect, a motor vehicle comprises: a frame, a body attached to the frame, a passenger compartment configured to accommodate at least one occupant, and at least one wheel attached to the frame, a power train attached to the frame by at least one solid engine mount, the at least one solid engine mount including a metal housing and an elastomeric bushing disposed within the metal housing, the elastomeric bushing being of solid construction with a single central bore, and the elastomeric bushing having at least one frustoconical portion with a free end.

In another aspect, the motor vehicle further comprises a bracket configured to attach the solid engine mount to the frame.

The motor vehicle according to claim 10 further comprising a washer disposed between the mount and the bracket.

In another aspect, the power train is transversely attached to the frame using four mounts.

In another aspect, the mounts are attached to the frame on the axes running through a center of gravity of the power train.

In another aspect, the mount has a first axis coaxial with the central bore, a second axis is orthogonal to and coplanar with the first axis, and a third axis is orthogonal to both the first axis and the second axis, the mount also has a first stiffness measured along the first axis, a second stiffness measured along the second axis, and a third stiffness measured along the third axis, wherein the second stiffness is substantially the same as the third stiffness.

In another aspect, the first stiffness is lower than the second stiffness.

In another aspect, at least one stiffness is adjusted to align a power train roll center with the power train center of gravity.

In another aspect, a method for mounting a power train in a motor vehicle comprises the steps of:

(i) positioning the power train within a frame of the motor vehicle;

(ii) attaching the power train to the frame with at least one solid engine mount having an elastomeric bushing disposed in a metal housing;

(iii) adjusting at least one axial stiffness of the solid engine mount to align a power train roll center with a power train center of gravity in at least two dimensions.

In another aspect, step (ii) further comprises installing the power train in a transverse position.

In another aspect, step (ii) further comprises using four mounts to attach the power train to the frame, wherein at least one of the four mounts comprises the solid engine mount.

In another aspect, step (iii) further comprises aligning the power train roll center with the power train center of gravity in all three dimensions.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A motor vehicle that includes a solid elastomeric engine mount is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes. In this specification, the term "power train" refers generally to an engine and a transmission.

Figure 1:
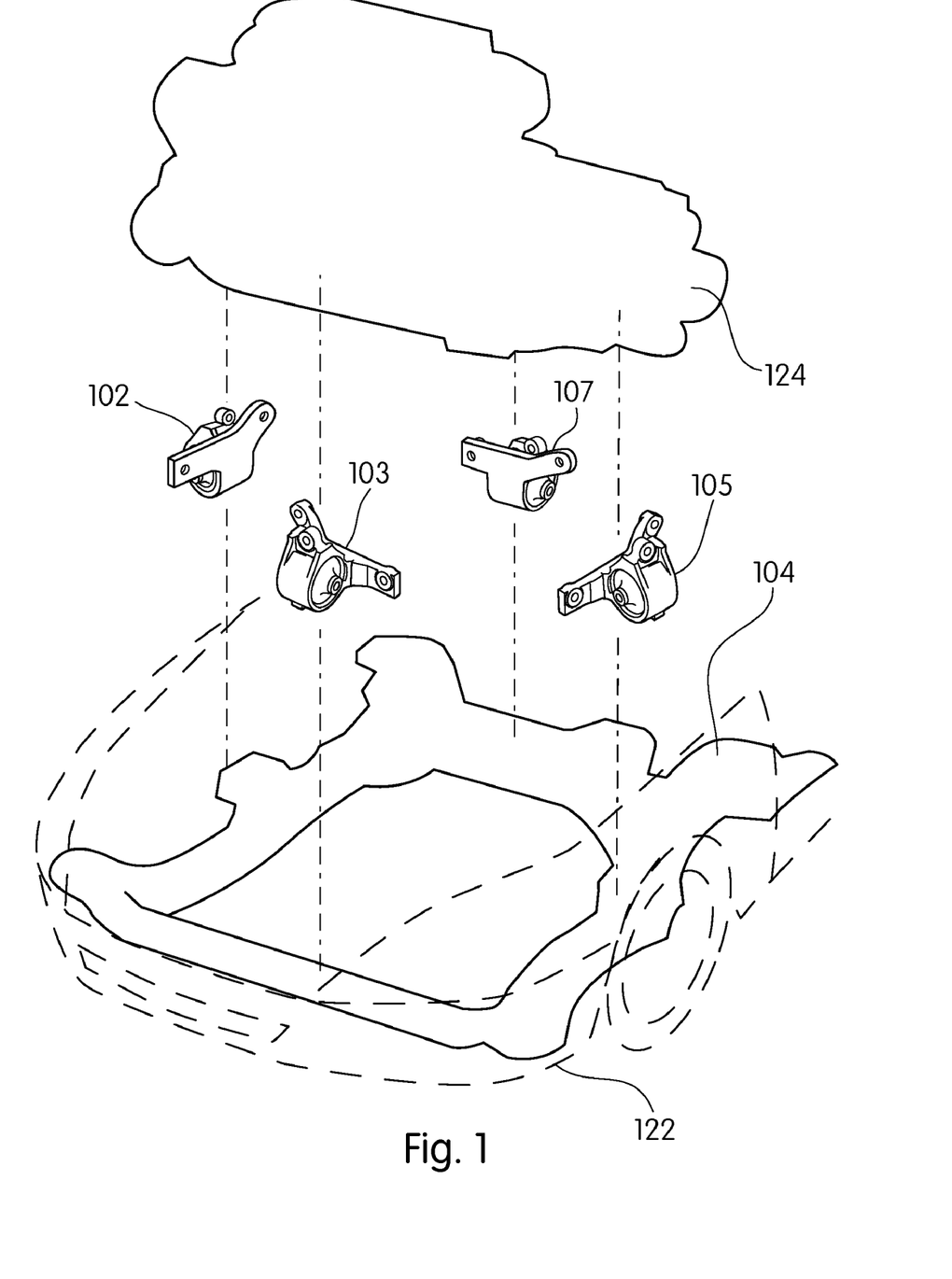
FIG. 1 is an isometric exploded view of the front end of a motor vehicle, with the body of the motor vehicle shown in phantom.

FIG. 1 is an exploded schematic diagram of the front end of a motor vehicle 122, the body of which is shown in phantom for clarity. Motor vehicle 122 includes a power train 124 which is attached to a frame 104. Power train 124 is preferably mounted to frame 104 using a four-point, transverse mounting system 100. In other words, four mounts 102, 103, 105, and 107 are used to secure power train 124 to frame 104, with one mount disposed on each leg of the substantially rectangular shape of frame 104. In other embodiments, power train 124 may be attached to frame 104 in any orientation and using any number of mounts 102.

Figure 2:
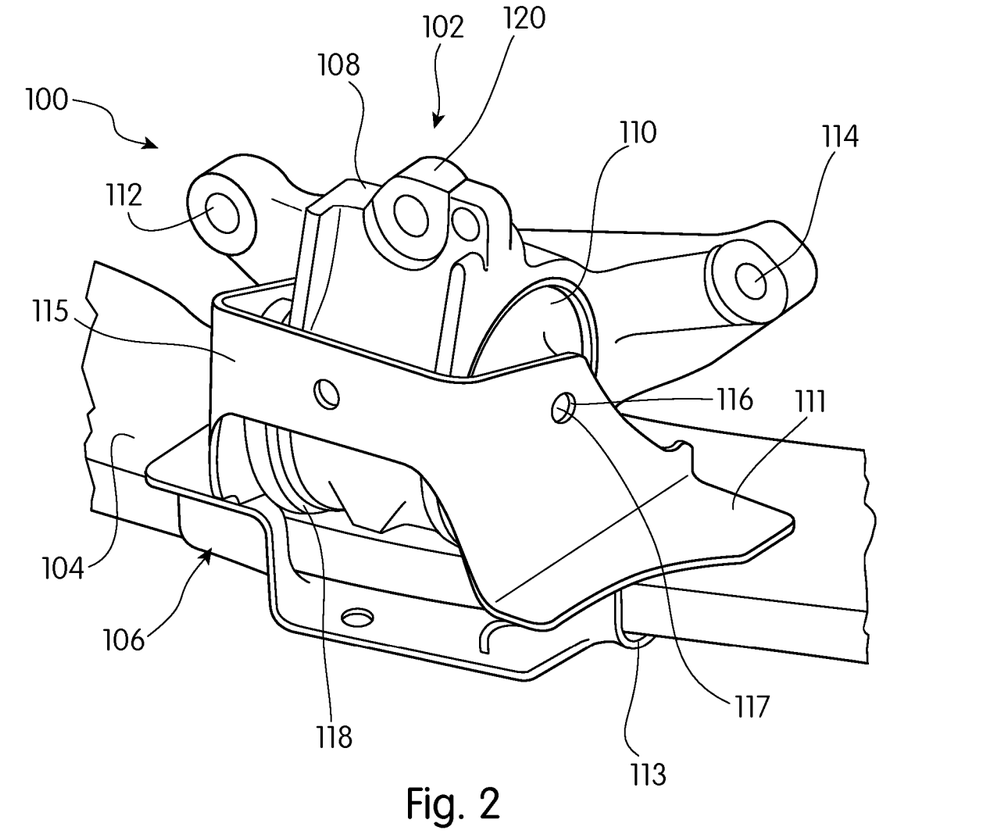
FIG. 2 is an isometric view of a solid engine mount attached to the frame of a motor vehicle.

Focusing on any one of mounts 102, FIG. 2 is an isometric view of one mount 102 of mounting system 100. Mount 102 is attached to a portion of frame 104 using a bracket 106. Bracket 106 may be any type of attachment mechanism known in the art, but is preferably a rigid metal or plastic unit configured to receive a portion of mount 102 above or adjacent to frame 104, with a lower portion 109 of bracket 106 configured to receive frame 104. Lower portion 109 of bracket 106 may be, for example, two flanges 111, 113 of material, with one flange 111 positioned on top of frame 104 and the other flange 113 positioned beneath frame 104. These two flanges 111, 113 may clamp onto frame 104, be welded onto frame 104, affixed to frame 104 using a bolt, screw, pin, cotter, or the like, or any combination of these attachment schemes.

Bracket 106 is preferably attached to mount 102 by inserting a metal housing 108 of mount 102 into an upper portion 115 of bracket 106. Mount 102 is preferably secured to bracket 106 by passing a rod-like member through a hole 116 formed in bracket 106, through an elastomeric bushing 110 of mount 102, and out of another hole (not shown) formed in bracket 106 opposite to hole 116. The rod-like member 117 may be a pin, bolt, screw, cotter, or the like. The rod-like member may be secured to bracket 106 using a nut, deforming the ends of the cotter pin, or by welding.

An optional washer 118 may be inserted between mount 102 and bracket 106 on one or both sides of mount 102. Optional washer 118 is preferably a disk of a rigid or elastomeric material, for example optional washer 118 may be made from a metal, such as steel or aluminum, or a non-metallic substance, for example, rubber, ceramic, or the like.

Figure 3:
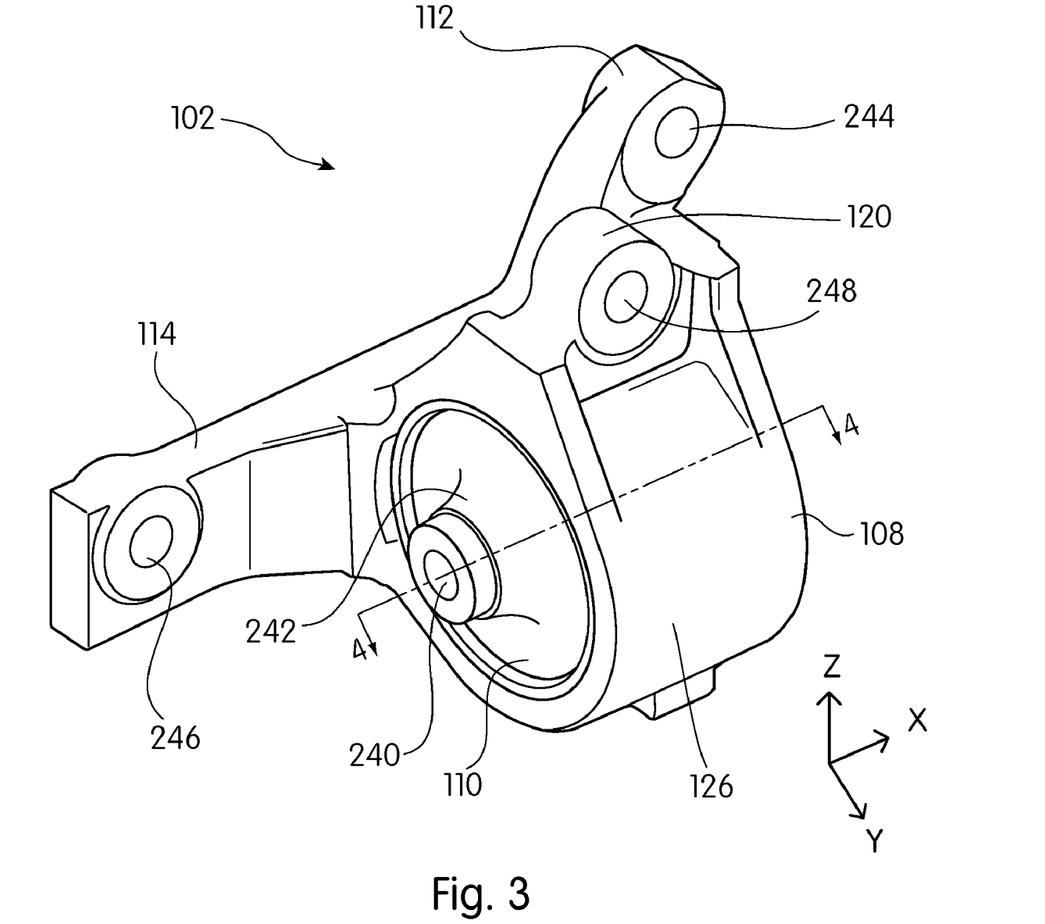
FIG. 3 is a an isometric view of a solid engine mount.

FIG. 3 shows mount 102 unattached to the frame (not shown) and positioned in a different orientation than shown in FIG. 2 for clarity. In the embodiment shown in FIG. 3, housing 108 of mount 102 includes three attachment portions 112, 114, 120 configured to attach mount 102 to the power train (not shown). In other embodiments, more or fewer attachment portions may be used. In this embodiment, shown in FIG. 3, first and second attachment portions 112, 114 are arm-like portions extending away from a central portion 126. Each attachment portion 112, 114 is configured to be connected to the power train, for example, each attachment portion 112, 114 includes a screw hole 244, 246, respectively, disposed through an end of attachment portion 112, 114. A third attachment portion 120 may be integrally formed with central portion 126, and may include a screw hole 248 positioned on an outer surface of central portion 126. Attachment portions 112, 114, 120 are preferably made of a strong, rigid material, such as a metal such as steel or aluminum, a ceramic material, or a resin material.

Each screw hole 244, 246, 248 is configured to receive a threaded screw, and unthreaded rod or bolt or the like. If a threaded screw is used, then an inner surface (not shown) of each screw hole 244, 246, 248 may be configured with corresponding threads. Each screw hole 244, 246, 248 is also configured to align with a corresponding hole disposed on the power train (not shown) so that a screw, rod, bolt, cotter, or similar attaching member may be used to connect mount 102 to the power train.

Figure 4:
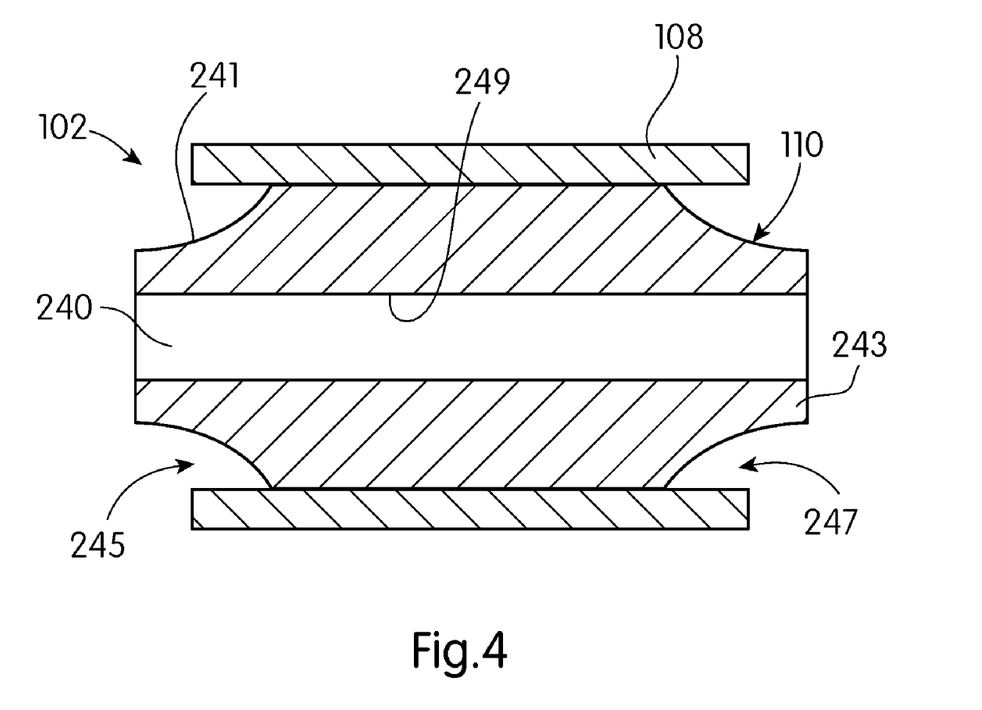
FIG. 4 is a cross-sectional view of the solid engine mount, taken along line 4-4 of FIG. 3.

Central portion 126 may be a hollow cylindrical shell having two open ends, shown in FIG. 4 as elements 245, 247. Central portion 126 is formed of the same material as that of attachment portions 112, 114, 120. Central portion 126 is preferably fashioned integrally with attachment portions 112, 114, 120 such that housing 108 is a single integral unit. Alternatively, attachment portions 112, 114, 120 may be separately fashioned and attached to central portion 126 by any method known in the art, such as by welding.

Central portion 126 is configured to receive elastomeric bushing 110. Elastomeric bushing 110 is preferably sized and dimensioned to fit snugly within and flush against an inner surface of central portion 126. Elastomeric bushing 110 is made of a substantially rigid yet compressible material such as non-metallic materials, for example rubber having a durometer between about 50 A and 95 A. Elastomeric bushing 110 includes a frustoconical portion 242 extending outward toward first open end 245 of central portion 126.

As shown in FIG. 4, which is a cross-sectional view of mount 102 taken along line 4-4 in FIG. 3, frustoconical portion 242 is coaxial with and generally defines central bore 240. Frustoconical portion 242 includes a small end which preferably protrudes slightly from central portion 126 through a first open end 245 of central portion 126. In another embodiment, frustoconical portion 242 may be flush with or recessed from first open end 245 of central portion 126.

Elastomeric bushing 110 includes a second frustoconical portion 243 formed opposite to first frustoconical portion 242. Second frustoconical portion 243 is generally a mirror-image of first frustoconical portion 242, with second frustoconical portion 243 extending away from first frustoconical portion 242 so that the small end of second frustoconical portion 243 preferably protrudes slightly from central portion 126 through a second open end 247. In other words, elastomeric bushing 110 is preferably symmetrical, with frustoconical ends 242, 243 extending in opposite directions away from the center of elastomeric bushing 110 so that frustoconical ends 242, 243 are unconstrained by housing 108.

Elastomeric bushing 110 is preferably solid. In some embodiments, elastomeric bushing 110 is a solid bushing which contains no visible voids, save for central bore 240. Central bore 240 preferably passes entirely through elastomeric bushing 110. Central bore 240 may be configured to allow rod-like member 117 (shown only in FIG. 2) to pass through elastomeric bushing 110. As such, an outer surface 241 of elastomeric bushing 110 is adjacent to housing 108 or is free from housing 108. Similarly, an inner surface 249 of elastomeric bushing 110 defines central bore 240 and may be in contact with or adjacent to the attachment mechanism securing mount 102 to frame 104 via bracket 106 (as shown in FIG. 2.) Inner surface 249 and outer surface 241 are preferably smooth, but may also include texture to prevent slippage against adjacent parts.

Elastomeric bushing 110 may be made by any means known in the art, such as by molding in one or more portions. Central bore 240 may be made during the molding process or cut or drilled into elastomeric bushing 110 after the body of elastomeric bushing of 110 has been completed.

Mount 102 not only attaches the power train to the frame, but also provides a responsive force to the vertical, horizontal, axial, and torque motions caused by the operation of the power train. Mount 102 minimizes the transfer of those motions and their NVH effects to the passenger compartment of the motor vehicle. Mount 102 responds to the motion of the power train with spring-like force under the force of the motion of the power train. The stiffness of mount 102 determines the amount of responsive spring-like force produced by mount 102.

Figure 5:
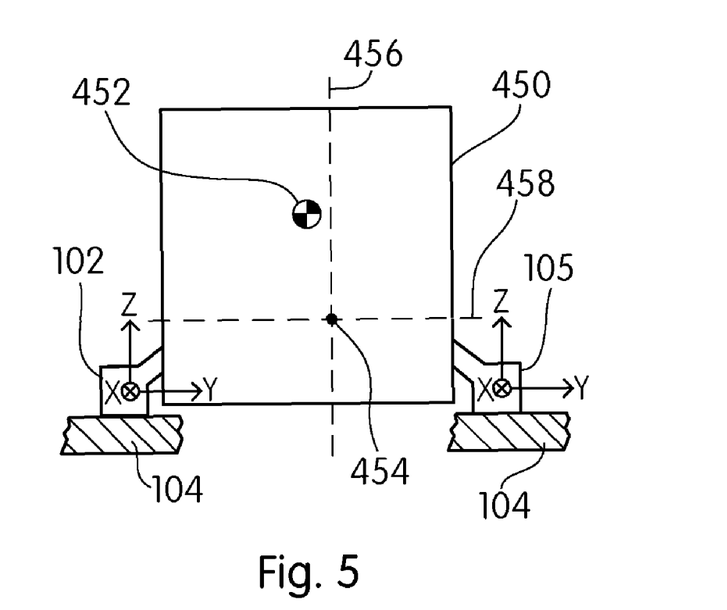
FIG. 5 is a block diagram showing the center of gravity and the roll axes of a mounted power train.
Figure 6:
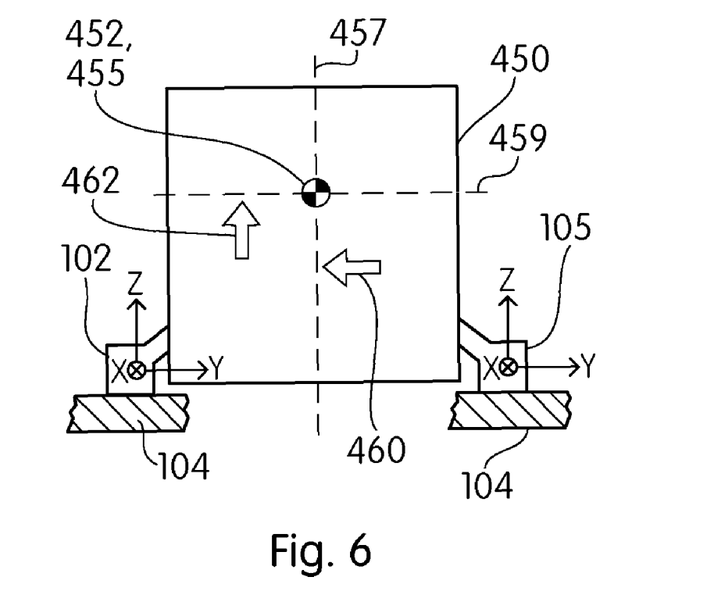
FIG. 6 is a block diagram showing how the roll axes can be moved to intersect the center of gravity of the mounted power train.

The stiffness of mount 102 can be measured along three orthogonal axes, whose directions are shown in FIGS. 3, 5, and 6. The X-axis is coaxial with and runs through central bore 240. The Y-axis is orthogonal to the X-axis and radial direction (the horizontal in FIG. 3), while the Z-axis is orthogonal to both the X-axis and the Y-axis, and is the radial direction (the vertical direction in FIG. 3.)

It is known that different orthogonal stiffnesses respond to different NVH effects. For example, relatively low stiffness along the X-axis has a positive impact on idle vibration and noise. Relatively low stiffness along the Y-axis has a positive affect on handling and noise. Stiffness along the Z-axis is preferably relatively high to improve ride characteristics.

In conventional mounts, stiffness along at least one of these orthogonal axes is not optimized for NVH. For example, in a conventional two-piece leg mount, the stiffness along the X-axis is typically about half of the stiffness along the Z-axis, while the stiffness along the Y-axis is typically about a third of the stiffness along the Z-axis. This ratio of stiffnesses yields a poor result for idle vibration and noise. Similarly, a mount similar in construction to the mount of the present invention with additional voids in the center bushing typically has an X-axis stiffness about a third of that of the Z-axis stiffness. The Y-axis stiffness is typically about 3.5 times that of the Z-axis stiffness. These ratios of stiffnesses yield poor results for both handling and noise.

In mount 102, however, the stiffnesses along the orthogonal axes are readily optimized for NVH. As elastomeric bushing 110 is positioned within housing 108 such that the ends of elastomeric bushing 110 remain unconstrained by the metal housing 108, the X-axis stiffness can be dramatically reduced, as the X-axis stiffness is entirely provided by the elastomeric material of bushing 110. The Y-axis and Z-axis stiffnesses are determined by the constrained stiffness of elastomeric bushing 110 within housing 108. As such, the Y-axis and Z-axis stiffnesses can be substantially similar, while the X-axis stiffness is between about 20% and about 30% of the Y-axis and Z-axis stiffnesses. Preferably, the X-axis stiffness is about 26% of the Y-axis and Z-axis stiffnesses. These ratios help to optimize both the handling and noise characteristics of mount 102.

Further, during the design phase for a particular motor vehicle, the stiffnesses of the orthogonal axes can be adjusted to optimize the stiffnesses for a particular frame, power train, and mount locations. The optimization effects are most pronounced when the power train roll center is substantially aligned with the power train center of gravity. FIGS. 5 and 6 are block diagrams which show the interplay between a power train 450 mounted to a frame 104 by mounts 102a and 102b. For simplicity, only two dimensions, Y and Z, are shown; the same technique may use adjustments in all three dimensions, i.e., including the X-axis stiffness, in substantially the same manner. Similarly, only two mounts, 102 and 105, are shown. However, this technique may be extended to any number of mounts, such as the four-point mounting system shown in FIG. 1, among others.

Once the locations for mounts 102a and 102b have been established, the location of a power train 450 center of gravity 452 may be determined using any method known in the art. The stiffnesses of mounts 102 and 105 define two roll axes, a Y-roll axis 458 and a Z-roll axis 456. The power train roll center 454, the point at which Y-roll axis 458 and Z-roll axis 456 intersect, may be determined. When originally mounted, power train roll center 454 is below and offset from center of gravity 452 toward mount 105. To align power train roll center 454 with center of gravity 452, the Z-axis stiffness of at least one of mounts 102 and 105 and/or the Y-axis stiffness of at least one of mounts 102 and 105 are adjusted.

As shown in FIG. 6, the Z-axis stiffness of mount 102 is increased and the Z-axis stiffness of mount 105 is decreased to shift Z-roll axis 456 to new Z-roll axis 457 in the direction of arrow 460. Similarly, the Y-axis stiffness of one or both mounts 102, 105 are decreased to shift Y-roll axis 458 in the direction of arrow 462 to new Y-roll axis 459. As such, power train roll center 454 is shifted to new power train roll center 455, which is substantially coincident with center of gravity 452. Aligning power train roll center 455 with power train center of gravity 452 helps to improve the overall dynamic characteristics of power train 450 and can also reduce noise and improve handling.

Adjustments to the stiffnesses of mounts 102 may occur along any axis, such as the X-axis, Y-axis, Z-axis, or any combination of axial stiffnesses. Additionally, the axial stiffness of any mount or combination of mounts in a motor vehicle may be adjusted to align the power train roll center with the power train center of gravity.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A mount for a motor vehicle power train, comprising:
a housing attachable to a motor vehicle;
an elastomeric bushing disposed within the housing;
the elastomeric bushing having a single central bore;
the elastomeric bushing having at least one frustoconical portion with an exposed end, wherein the mount having a first axis coaxial with the central bore, a second axis orthogonal to and coplanar with the first axis, and a third axis orthogonal to both the first axis and the second axis;
the mount having a first stiffness measured along the first axis, a second stiffness measured along the second axis, and a third stiffness measured along the third axis;
wherein the second stiffness is substantially the same as the third stiffness; and
wherein the first stiffness is between about 20 percent and about 30 percent of the second stiffness.

2. The mount according to claim 1, wherein the first stiffness is about 26 percent of the second stiffness.

3. The mount according to claim 1, wherein the elastomeric bushing comprises a rubber material.

4. The mount according to claim 1, wherein the mount is attached to a motor vehicle frame with a bracket, wherein the bracket is attached to the mount at the central bore with a connecting member.

5. The mount according to claim 4, wherein the mount is configured to attach to a portion of the motor vehicle power train.

6. A motor vehicle comprising:
a frame and a body attached to the frame;
a power train attached to the frame by at least one solid engine mount;
the solid engine mount including a metal housing and a solid elastomeric bushing disposed within the metal housing;
the elastomeric bushing having a single central bore;
the elastomeric bushing having at least one frustoconical portion with a free end;
the power train having a center of gravity and the bushing having a stiffness in a direction defining a power train roll center, the stiffness of the bushing being selected to align the power train roll center with the power train center of gravity when the bushing is not physically aligned with the power train center of gravity.

7. The motor vehicle according to claim 6 further comprising a bracket configured to attach the solid engine mount to the frame.

8. The motor vehicle according to claim 7 further comprising a washer disposed between the mount and the bracket.

9. The motor vehicle according to claim 6, wherein the power train is transversely attached to the frame using four mounts.

10. The motor vehicle according to claim 9, wherein the mounts are attached to the frame on the axes running through a center of gravity of the power train.

11. A motor vehicle comprising:
a frame and a body attached to the frame;
a power train attached to the frame by at least one solid engine mount;
the solid engine mount including a metal housing and a solid elastomeric bushing disposed within the metal housing;
the elastomeric bushing having a single central bore;
the elastomeric bushing having at least one frustoconical portion with a free end, wherein
the mount having a first axis coaxial with the central bore, a second axis orthogonal to and coplanar with the first axis, and a third axis orthogonal to both the first axis and the second axis; and
the mount having a first stiffness measured along the first axis, a second stiffness measured along the second axis, and a third stiffness measured along the third axis;
wherein the second stiffness is substantially the same as the third stiffness.

12. The motor vehicle according to claim 11, wherein the first stiffness is lower than the second stiffness.

13. The motor vehicle according to claim 11, wherein at least one stiffness is adjusted to align a power train roll center with the power train center of gravity.

14. A method for mounting a power train in a motor vehicle comprising the steps of:
(i) positioning the power train on a frame of the motor vehicle;
(ii) attaching the power train to the frame with at least one solid engine mount having an elastomeric bushing disposed in a metal housing;

(iii) comparing a power train roll center with a power train center of gravity in at least two dimensions; and
(iv) adjusting at least one axial stiffness of the solid engine mount to align the power train roll center with the power train center of gravity in the at least two dimensions without repositioning the at least one solid engine mount.

15. The method of mounting a power train in a motor vehicle according to claim 14, wherein step (ii) further comprises installing the power train in a transverse position.

16. The method of claim 15, wherein step (ii) further comprises using four mounts to attach the power train to the frame, wherein at least one of the four mounts comprises the solid engine mount.

17. The method of claim 14, wherein step (iii) further comprises aligning the power train roll center with the power train center of gravity in all three dimensions.

* * * * *